United States Patent
Furuskar et al.

(10) Patent No.: US 8,780,877 B2
(45) Date of Patent: Jul. 15, 2014

(54) METHOD AND ARRANGEMENT FOR MANAGING A REFERENCE SIGNAL IN A COMMUNICATIONS SYSTEM

(75) Inventors: Anders Furuskar, Stockholm (SE); Per Skillermark, Stockholm (SE)

(73) Assignee: Telefonaktiebolaget L M Ericsson (publ), Stockholm (SE)

(*) Notice: Subject to any disclaimer, the term of this patent is extended or adjusted under 35 U.S.C. 154(b) by 6 days.

(21) Appl. No.: 13/399,244

(22) Filed: Feb. 17, 2012

(65) Prior Publication Data

US 2012/0147797 A1   Jun. 14, 2012

Related U.S. Application Data

(63) Continuation of application No. 12/293,742, filed as application No. PCT/SE2006/000374 on Mar. 24, 2006, now Pat. No. 8,121,106.

(51) Int. Cl.
*H04B 7/00* (2006.01)
*H04L 5/14* (2006.01)

(52) U.S. Cl.
USPC ........... 370/344; 370/295; 370/252; 370/480; 455/522

(58) Field of Classification Search
USPC ............. 370/344, 295, 319, 332, 480, 252; 455/522
See application file for complete search history.

(56) References Cited

U.S. PATENT DOCUMENTS

| 7,707,474 B2 * | 4/2010 | Rinne et al. ............ 714/748 |
| 2002/0026348 A1 | 2/2002 | Fowler et al. |
| 2002/0173277 A1 * | 11/2002 | Takao et al. ............ 455/77 |
| 2003/0026348 A1 | 2/2003 | Llang et al. |
| 2004/0082356 A1 | 4/2004 | Walton et al. |
| 2005/0143121 A1 * | 6/2005 | Huh et al. ............ 455/522 |
| 2005/0201319 A1 | 9/2005 | Lee et al. |
| 2006/0094435 A1 | 5/2006 | Thomas et al. |
| 2010/0165894 A1 | 7/2010 | Furuskar et al. |

FOREIGN PATENT DOCUMENTS

| EP | 0899972 A2 | 3/1999 |
| EP | 1551112 A2 | 7/2005 |
| GB | 2353181 A | 2/2001 |

OTHER PUBLICATIONS

Koutalos, A. C. et al. "Effect of frequency division duplex on open loop downlink beamforming in wcdma systems". In: IEEE 56$^{th}$ Vehicular Technology Conference Proceedings. VTC 2002-Fall. Vancouver, Canada, Sep. 24-28, 2002, vol. 1, pp. 686-690, ISBN 0-7803-74673, XP010608899.

* cited by examiner

*Primary Examiner* — Paul H Masur

(57) ABSTRACT

A method for managing uplink channel estimation in a base station includes transmitting downlink data from a base station to a mobile terminal in a radio access network over a first portion of a Frequency Division Duplex (FDD) spectrum. The first portion of the FDD spectrum is designated for downlink data transfer. The method also includes transmitting a predetermined reference signal from the base station to the mobile terminal over a second portion of the FDD spectrum. The second portion of the FDD spectrum is designated for uplink data transfer. The predetermined reference signal permits the mobile terminal to perform a channel estimate on at least a portion of the second portion of the FDD spectrum. The method additionally includes receiving uplink data transmitted from the mobile terminal to the base station over the second portion of the FDD spectrum.

12 Claims, 4 Drawing Sheets

METHOD AND ARRANGEMENT FOR MANAGING A REFERENCE SIGNAL IN A COMMUNICATIONS SYSTEM

CLAIMING BENEFIT OF PRIOR FILED U.S. APPLICATION

This application is a continuation of International Application PCT/SE2006/000374, with an international filing date of Mar. 24, 2006, which corresponds to the national-stage entry U.S. patent application Ser. No. 12/293,742, filed on Sep. 19, 2008, now U.S. Pat. No. 8,121,106, the contents of which are hereby incorporated by reference herein.

TECHNICAL FIELD

The present invention relates to a method and arrangement for a base station in a radio access network using FDD, and a method and arrangement for a mobile terminal in a in a radio access network using FDD. In particular the present invention relates to uplink channel estimation.

BACKGROUND OF THE INVENTION

With the increasing availability of efficient and low cost electronic modules, mobile communication systems are becoming more and more widespread. For example, there are many variations of communication schemes in which various frequencies, transmission schemes, modulation techniques and communication protocols are used to provide two-way voice and data communications in a handheld, telephone-like communication terminal. The different modulation and transmission schemes each have advantages and disadvantages. In a wireless network, the covering area of an operator is divided into cells. A cell corresponds to the covering area of one or more base stations communicating with terminals within the cell. When the user of a terminal moves between cells, or the radio coverage areas associated with different base station sites, an ongoing call must be switched to a different radio coverage channel or cell. The base station transmits signals to the terminals within the cell in down link and these terminals transmit signals to the base station in uplink.

Duplex in wireless networks relates to how signals, transmitted in the downlink and uplink, are multiplexed. In Frequency Division Duplex (FDD) systems, downlink and uplink signals are transmitted in different frequency bands, separated by a duplex distance. The duplex distance is often larger than the downlink and uplink signal bandwidths, resulting in a pair of spectrum allocations with a gap in between. This spectrum allocation is often referred to as paired spectrum. In Time Division Duplex (TDD) systems downlink and uplink signals are transmitted at the same frequencies but at different instants in time. E.g. Wideband Code Division Multiple Access (WCDMA) and IEEE 802.16-based systems can operate in both FDD and TDD modes.

A benefit of TDD systems is that the channel is reciprocal, i.e. the channel is the same in both uplink and downlink. This means e.g. that a terminal that can estimate the downlink channel also knows the uplink channel. This can be used for e.g. accurate power control, link adaptation, and antenna weight selection.

In FDD systems, the downlink and uplink channels are different because of the frequency separation between downlink and uplink bands, which leads to different multi path fading. A problem is how to perform uplink channel estimation for FDD systems. One way of solving the problem is to use reference signals, also called pilots. Each of the terminals within the cell sends a known reference signal with known amplitude/s and phase reference/s to the base stations. The base stations perform channel estimation by measuring each of the received reference signals. Channel estimation may e.g. be done by measuring the amplitude(s) and phase(s) of the received reference signals and comparing the results with the known transmitted signal, i.e. comparing with the known amplitude and phase reference, and in that way the base station generates estimates of the uplink channels. The base stations then either report this result back to each of the terminals within the cell, and/or uses the result themselves to schedule the users in appropriate parts of the band, select power levels, modulation and coding schemes etc., and report the decisions to the terminals. The FDD modes of WCDMA and 802.16 use the above principle which principle for example is described in US2006018368.

A disadvantage of this approach is that it involves a significant overhead. Uplink pilots have to be transmitted by and reported back to all terminals within the cell. If the uplink pilots are used for channel dependent scheduling, link adaptation, or power control in the frequency domain, pilots must basically cover the whole uplink bandwidth, which causes a large overhead and is time consuming. Once the report arrives at the terminal, the channel might have changed.

SUMMARY OF THE INVENTION

It is therefore an object of the present invention to provide a mechanism of channel estimation in a FDD system that is less over head consuming and less time consuming.

The basic principle of solving the problem in a FDD system is to use the uplink band, being intended for uplink data transfer, to send reference signals from the base station to the mobile terminals for performing the channel estimation of the uplink band.

According to a first aspect of the present invention, the object is achieved by a method for managing uplink channel estimation in a base station. The base station is comprised in a radio access network using Frequency Division Duplex (FDD). The base station is associated with a first cell of a number of cells within the radio access network. The base station is adapted to connect at least one mobile terminal, being situated in the first cell, to a network infrastructure. The method comprises the step of transmitting a redirected reference signal on an uplink band to the mobile terminal. The redirected reference signal being intended for uplink channel estimation.

According to a second aspect of the present invention, the object is achieved by an arrangement in a base station being comprised in a radio access network using Frequency Division Duplex (FDD). The base station is associated with a first cell of a number of cells within the radio access network. The base station is adapted to connect at least one mobile terminal, being situated in the first cell, to a network infrastructure. The base station arrangement comprises a transmitter for transmitting a redirected reference signal on an uplink band to the terminal, said redirected reference signal being intended for uplink channel estimation.

According to a third aspect of the present invention, the object is achieved by a method for managing uplink channel estimation in a mobile terminal. The mobile terminal is comprised in a radio access network using Frequency Division Duplex (FDD). The radio access network comprises a number of cells. The mobile terminal is situated in a first cell of said number of cells and the mobile terminal is connectable to a network infrastructure via a base station associated with the first cell. The method comprises the step of receiving a redirected reference signal on an uplink band from the base station. The redirected reference signal is intended for uplink channel estimation.

According to a fourth aspect of the present invention, the object is achieved by an arrangement in a mobile terminal being comprised in a radio access network using Frequency Division Duplex (FDD). The radio access network comprises a number of cells and the mobile terminal is situated in a first cell of said number of cells. The mobile terminal is connectable to a network infrastructure via a base station associated with the first cell. The mobile station arrangement comprises a receiver for receiving a redirected reference signal, on the uplink band, front the base station. The redirected reference signal is intended for uplink channel estimation.

Since the redirected reference signal is transmitted from the base station to the mobile terminal on the uplink band, there is no longer any need for each of the mobile terminals to transmit any reference signals on the uplink band to the base station that compares each of the received redirected reference signals with the known redirected reference signal and reports the result back to the terminals. Instead the mobile terminals are capable to do the channel estimation themselves which makes the present solution less over head consuming and less time consuming.

An advantage with the present invention is that the channel estimation is improved. Since the channel estimation can be performed more efficiently (using less overhead), more room for data transmission and increased capacity is provided.

A further advantage with the present invention is that the improved channel estimation leads to increased quality, capacity and coverage.

DETAILED DESCRIPTION OF PREFERRED EMBODIMENTS

The invention is defined as a method and an arrangement which may be put into practice in the embodiments described below.

Figure 1:
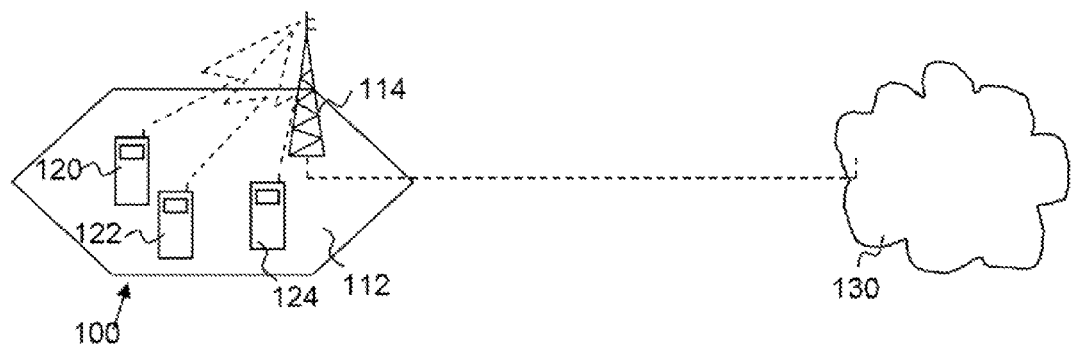
FIG. 1 is a schematic block diagram illustrating a radio access network.

FIG. 1 depicts a radio access network 100 comprising a number of cells and which radio access network 100 uses technologies such as e.g. WCDMA, Enhanced UMTS Terrestrial Radio Access (E-UTRA) (Universal Mobile Telecommunications System (UMTS)), 3G Long Term Evolution (3GLTE), Super 3G or Wireless World Initiative New Radio (WINNER). The radio access network 100 uses FDD technology.

The radio access network 100 further comprises a base station 114 associated with a first cell 112 of said number of cells. The base station 114 is connectable to an infrastructure network 130 such as e.g. the Public Switched Telephone Network (PSTN), an IP network or a radio access network.

One or more mobile terminals 120, 122 and 124 are located under radio coverage of the radio access network 100 and are connectable to the infrastructure network 130, by means of the base station 114 associated with the cell 112 in which the mobile terminals 120, 122 and 124 currently are positioned. The mobile terminals 120, 122 and 124 may be personal digital assistants (PDA), laptop computers or any type of devices capable of communicating via radio resources. The frequency band that is designated for uplink data transfer, i.e. for data transfer from the mobile terminals 120, 122 and 124 to the base station 114, is from now on called the uplink band and correspondingly, the frequency band that is designated for downlink data transfer, i.e. for data transfer from the base station 114 to the mobile terminals 120, 122 and 124, is from now on called the downlink band.

The base station 114 comprises a transmitter for transmitting information to the mobile terminals 120, 122 and 124, both in the uplink band and in the downlink band. The base station 114 transmits a known redirected reference signal in the uplink band to the mobile terminals 120, 122 and 124, currently being positioned in the cell 112 that is associated to the base station 114. The redirected reference signal is to be used for estimating the uplink channel quality, and is therefore sent in the uplink band. Instead of that each of the mobile terminals 120, 122 and 124 transmit the redirected reference signal on the uplink band to the base station 114 that compares each of the received redirected reference signals with the known redirected reference signal and reports the result back to the mobile terminals, the base station 114 transmits the redirected reference signal in the uplink band which is received by all mobile terminals 120, 122 and 124. This is advantageous since it is the mobile terminals 120, 122 and 124 that in the first case require the information provided by comparing the known redirected reference signal with the received redirected reference signal, and the mobile terminals 120, 122 and 124 are capable to do the channel estimation themselves which in this way decreases the amount of transmissions. Reporting back to the base station 114 is only necessary in some cases e.g. for channel quality dependent scheduling (se later on). It is given that the channel is reciprocal. The known redirected reference signal has known amplitude(s) and a known phase reference(s) and is compared with the amplitude(s) and phase reference(s) of the received redirected reference signal in a conventional way.

Figure 2:
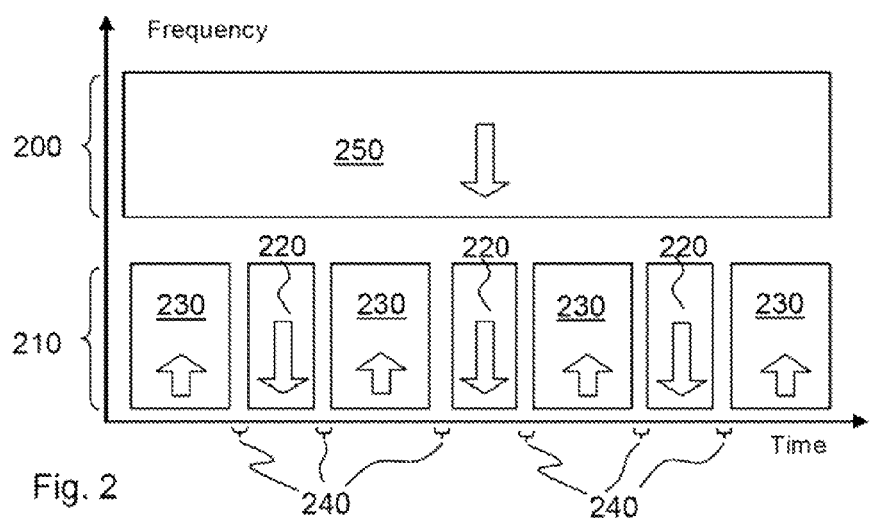
FIG. 2 is a schematic block diagram illustrating an uplink band and a downlink band of an FDD system.

The basic downlink and uplink structure is depicted in FIG. 2 wherein the longitudinal axis shows time and the lateral axis shows frequency. Arrows pointing downwards indicate transmittal from the base station 114 to the mobile terminals 120, 122 and 124, and arrows pointing upwards indicate transmittal from the mobile terminals 120, 122 and 124 to the base station 114. The downlink band is referred to as 200 and the uplink band is referred to as 210. Since the different mobile terminals 120, 122 and 124 may transmit data in different parts of the uplink frequency band, redirected reference signals 220 should preferably be time multiplexed and preferably cover the entire uplink frequency band to enable channel estimation covering the entire uplink band. Frequency multiplexing of the redirected reference signals 220 is possible, but is less efficient as a relatively large frequency guard band would be required between simultaneous uplink and downlink transmissions.

The time multiplexing is preferably performed in the uplink band 210 such that redirected reference signal 220 is transmitted in one time frame and uplink data 230 is transmitted from the mobile terminals 120, 122 and 124 to the base station 114 in another time frame. It is preferable if the redirected reference signal 220 is surrounded by some guard period 240, e.g. 60-70 µs, to obtain enough time for switching from downlink transmission to uplink transmission. Therefore it is preferable to not transmit redirected reference signals to often. The redirected reference signals 220 should be transmitted frequently enough to follow fast channel variations. However, the more frequently the redirected reference signal 220 are transmitted, the larger the overhead. Therefore, adapting the redirected reference signal 220 frequency in accordance with the channel coherence time may be a useful means to limit the overhead. Channel coherence time, however, is (typically) different for different mobile terminals depending on how fast they move and it may hence be necessary to select a frequency that is sufficiently high for a majority of the user population and simply accept that mobile terminals 120, 122 and 124 experiencing very fast channel variations, e.g. since these are fast moving, may not be able to utilize the redirected reference signal. Coherence time may be estimated as Tc=c/(f*v), where c is the speed of light, f is carrier frequency and v is the speed of the mobile terminal. E.g. if f=2 GHz and v=1 m/s, Tc=3e8/(2e9*1)=0.15 s. The redirected reference signal 220 may for example be transmitted once every 5-30 ms frame, preferably once every 10 ms frame. It is also possible to transmit multiple redirected reference signals per frame. Note that interference is not reciprocal, uplink interference is however known by the base station 114 and the base station may signal (broadcast) this information to the terminals 120, 122 and 124. The downlink data 250 is transmitted from the base station 114 to the mobile terminals 120, 122 and 124 in the downlink band 200 in conventional way.

Figure 3:
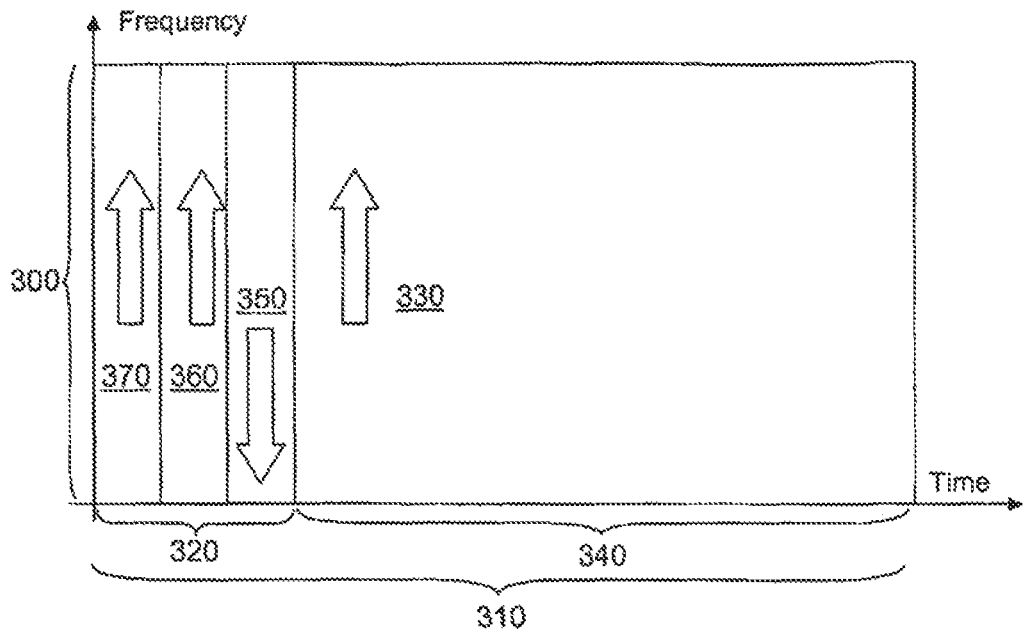
FIG. 3 is a schematic block diagram illustrating an uplink band of an FDD system

One embodiment of the present invention may be used in the radio interface framework WINNER. A schematic view over the basic uplink structure of the WINNER super-frame structure is depicted in FIG. 3, wherein the longitudinal axis shows time and the lateral axis shows frequency. The uplink band is referred to as 300 and the super-frame is referred to as 310. Arrows pointing downwards indicate transmittal from the base station 114 to the mobile terminals 120, 122 and 124, and arrows pointing upwards indicate transmittal from the mobile terminals 120, 122 and 124 to the base station 114. The first part 320 of the super-frame 310 is designated to e.g. uplink synchronization and random access while the actual data transmission 330 resides in the latter part 340 of the super-frame 310. The duration of the entire super-frame 310 is e.g. in the order of 5 ms. In this embodiment a resource is preferably reserved for the redirected reference signal 350 in the uplink band 300 in each super-frame 310 or less frequent if suitable. The redirected reference signal 350 resource may e.g. be reserved in the first part 320 of the super-frame 310 together with e.g. reserved resources for Random Access Channel (RACH) 360 and for uplink synchronisation 370. The base station 114 accordingly uses the reserved redirected reference signal resource 350 to send the redirected reference signal to the mobile terminals 120, 122 and 124 in the uplink band.

In one embodiment of the present invention, the uplink band information estimated by the mobile terminals 120, 122 and 124 by comparing the known redirected reference signal with the received redirected reference signal is required by the base station 114 and the uplink band information is therefore reported back to the base station 114. This may be performed by the mobile terminals 120, 122 and 124 reporting estimated uplink channel quality together with the downlink quality report.

One example when the uplink band information may be used for the base station 114 is when the base station 114 shall perform uplink quality based frequency domain scheduling in the time and possible also in the frequency domain. This is e.g. usable within the WINNER technology mentioned above.

In this case the mobile terminals 120, 122 and 124 utilize the redirected reference signals received from the base station 114 for channel quality estimation. The mobile terminals 120, 122 and 124, report the estimated channel quality back to the base station 114 that in turn uses the estimated channel quality as an input to the scheduling algorithm. The base station transmits uplink scheduling control messages to each of the mobile terminals 120, 122 and 124 (in the downlink) and each of the mobile terminals 120, 122 and 124 transmit data, using assigned resources based on the estimated channel quality reported to the base station 114.

Compared to a conventional solution, in which mobile terminals send uplink reference signals that are used for channel quality estimation, the solution according to the invention may invoke a slightly higher delay. However, with many mobile terminals 120, 122 and 124 active in the uplink, all transmitting reference signals covering the entire uplink frequency band, the over head is however smaller which is an advantage that outweighs the disadvantage with said delay.

It should be noted that a set of 'regular reference signals' still may be transmitted from the terminal 120, 122 and 124 to the base station 114 to enable the base station to be able to demodulate the data. These regular reference signals need however only be transmitted together with data from the terminal 120, 122 and 124, i.e. at time instants and frequency bands the terminal 120, 122 and 124 is transmitting. As these regular reference signals do not need to cover the entire frequency band, and do not need to be transmitted from terminals 120, 122 and 124 not transmitting data, they cause only limited overhead. The channel estimates based on these regular reference signals could also be used as input to the scheduler, possibly in combination with the channel estimates reported by the mobile terminals 120, 122 and 124.

Figure 4:
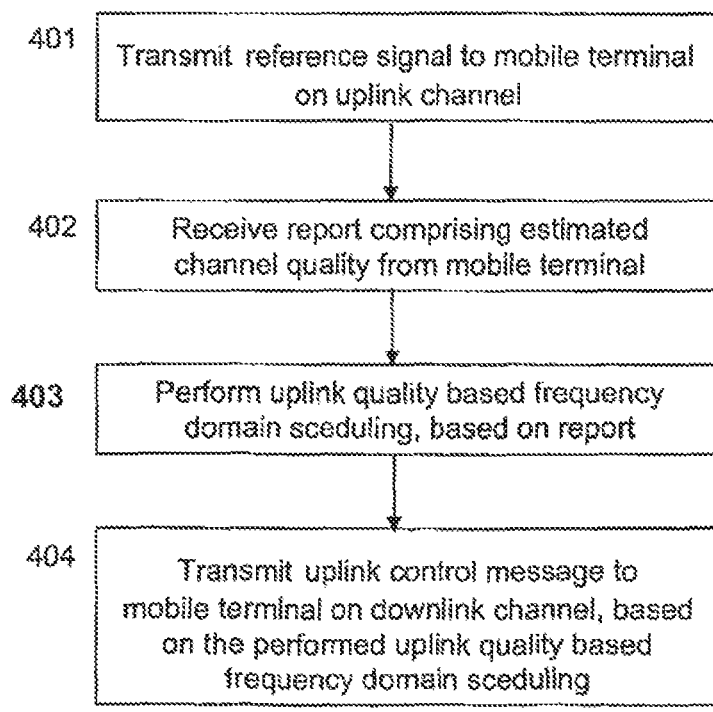
FIG. 4 is a flow chart illustrating a method in a base station.

The present method steps performed by the base station 114 will now be described with reference to a now chart depicted in FIG. 4.

401. The base station transmits a redirected reference signal 220,350 on the uplink band to the mobile terminal 120, 122, and 124 which redirected reference signal 220,350 is intended for uplink channel estimation.

402. When the mobile terminal (120,122,124) that knows the origin redirected reference signal, has performed the uplink channel estimation by estimating the received redirected reference signal and comparing the known redirected reference signal with the received redirected reference signal, the base station 114 may receive a report from the mobile terminal (120,122,124), which report comprises the uplink channel quality, estimated by the mobile terminal (120,122,124). The base station may at the same time receive a regular uplink reference signal from the mobile terminal 120,122,124, and estimate the uplink channel quality, based on the received regular reference signal.

403. The base station 114 may perform uplink quality based frequency domain scheduling based on the uplink channel quality comprised in the report and, also based on the estimated uplink channel quality, based on the received regular reference signal if such a regular signal is received. This may be performed by input the received channel quality to the scheduling algorithm for uplink quality based frequency domain scheduling in the time and/or in the frequency domain.

404. The base station 114 then transmits an uplink control message, on a downlink channel to the mobile terminal 120,122,124, based on the performed uplink quality based frequency domain scheduling.

Figure 5:
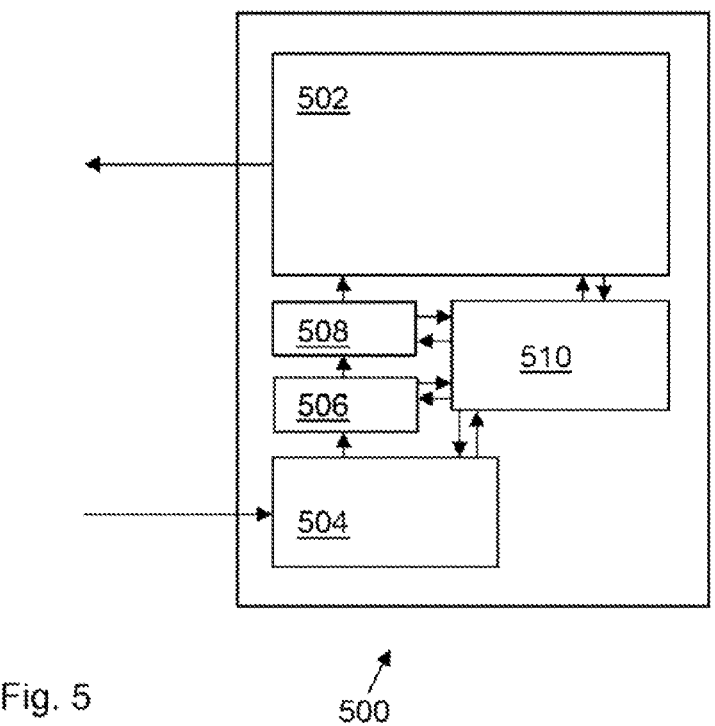
FIG. 5 is a schematic block diagram illustrating an arrangement in base station.

To perform the present method steps, the base station 114 comprises an arrangement 500 as depicted in FIG. 5. The base station arrangement 500 comprises a transmitter 502 for transmitting the redirected reference signal 220,350 on an uplink band to the mobile terminal 120, said redirected reference signal 220,350 being intended for uplink channel estimation. The transmitter 502 may be adapted to transmit the redirected reference signal 220,350 time multiplexed, and further to transmit the redirected reference signal 220,350 such that it covers the entire uplink frequency band. In one embodiment the transmitter further is adapted to transmit the redirected reference signal 220,350 surrounded by a guard period 240, which guard period 240 for example is 60-70 µs. In another embodiment the transmitter 502 is adapted to transmit the redirected reference signal 220,350 frequency multiplexed. The transmitter 502 may be arranged to transmit the redirected reference signal 220,350 with a frequency that is adapted in accordance with the channel coherence time. The channel coherence time may be estimated as $Tc=c/(f*v)$. The redirected reference signal 220,350 may be transmitted the e.g. in every 5-10 ms frame, preferably in every 10 ms frame. In one embodiment the transmitter 502 is arranged to transmit multiple redirected reference signals 220,350 per time frame. In a further embodiment the WINNER technology is used, in which embodiment the transmitter 502 is arranged to transmit the redirected reference signal 350 in the first part of a super-frame.

In a further embodiment the base station arrangement 500 comprises a receiver 504 arranged for receiving a report from the mobile terminal 120,122,124 that has received the redirected reference signal. The report comprises the uplink channel quality, estimated by the mobile terminal 120,122,124, which mobile terminal 120,122,124 knows the origin redirected reference signal and estimates the received redirected reference signal and compares the known redirected reference signal with the received redirected reference signal. In one embodiment the base station arrangement 500 comprises means 506 for performing uplink quality based frequency domain scheduling based on the uplink channel quality comprised in the report. The uplink quality based frequency domain scheduling means 506 may be arranged to input the received channel quality to the scheduling algorithm for uplink quality based frequency domain scheduling in the time and/or in the frequency domain. In another embodiment is the receiver 504 further arranged to receive a regular uplink reference signal from the mobile terminal 120,122,124 and in this embodiment the base station arrangement 500 further comprises an estimation unit 508 for estimating the uplink channel quality, based on the received regular reference signal. In this case the uplink quality based frequency domain scheduling means 506 further is arranged to input channel quality, based on the received regular reference signal, to the scheduling algorithm for uplink quality based frequency domain scheduling in the time and/or in the frequency domain. The transmitter 502 may be arranged to transmit an uplink control message on a downlink channel to the mobile terminal 120,122,124 based on the performed uplink quality based frequency domain scheduling.

The mobile terminal which may be any of the mobile terminals 120, 122 and 124 is in this example referred to as mobile terminal 120. The mobile terminal 120 is currently being positioned in the cell 112 associated to the base station 114. The mobile terminal 120 comprises a receiver for receiving downlink information from the base station 114 in both the uplink band and in the downlink band. The mobile terminal 120 receives the redirected reference signal, sent from the base station 114, in the uplink band. The mobile terminal 120 uses the redirected reference signal, sent in the uplink band for estimating the uplink channel quality. The mobile terminal 120 knowing the origin redirected reference signal, estimates the uplink channel by estimating the received redirected reference signal and comparing the known redirected reference signal with the received redirected reference signal. As mentioned above, the known redirected reference signal has known amplitude and a known phase reference and is compared with the amplitude(s) and phase(s) of the received signal in a conventional way. The estimated uplink channel quality may be used by the mobile terminal itself and/or be reported back to the base station 144 so that the base station 114 can utilize the information, the latter is described above.

The estimated channel quality from redirected reference signals sent from the base station 114 in the uplink frequency band can be used by the mobile terminal 120 for e.g. adaptive modulation and coding or power control. The mobile terminal 120 is aware of the uplink interference level, provided e.g. by means of downlink signalling. By means of the estimated channel quality, the mobile terminal 120 is on its own capable of determining which transmission format, such as modulation and coding scheme, which power to use in the next transmission. The advantage with this is that the downlink signalling is reduced and that the time between channel quality estimation and transmission is shortened. For RACH or contention-based data transmission, the estimated channel quality information provided by the mobile terminal 120 may further give useful indications of which power level and transmission format the mobile terminal 120 shall use in order to achieve reliable transmission without causing excessive interference in the network. To adapt these transmissions to the fast channel variations is otherwise difficult.

Figure 6:
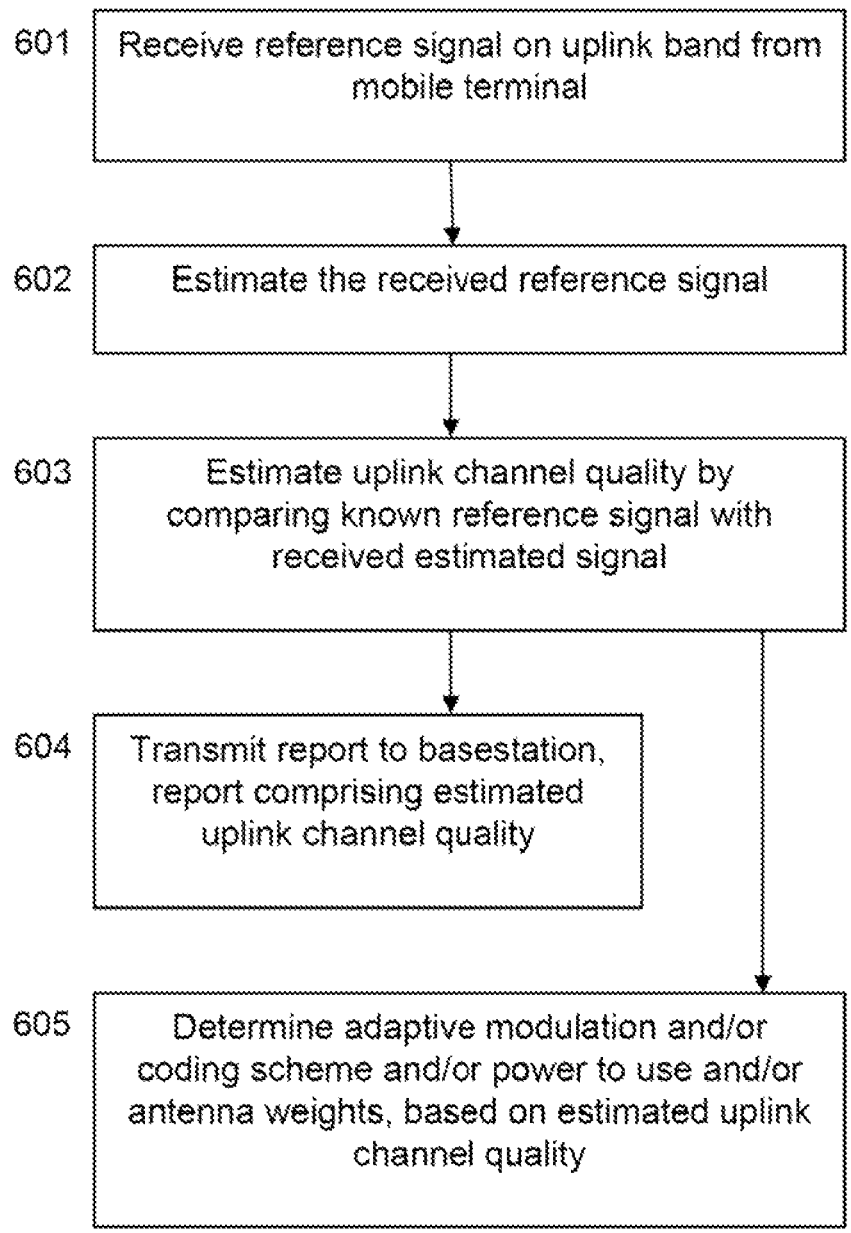
FIG. 6 is a flow chart illustrating a method in a mobile terminal.

The method steps performed by the present mobile terminal 120 will now be described with reference to a flow chart depicted in FIG. 6.

601. The mobile terminal 120 receives a redirected reference signal 220,350 on an uplink band from the base station 114, said redirected reference signal 220,350 being intended for uplink channel estimation.

602. The mobile terminal 120 estimates the received redirected reference signal

603. The mobile terminal 120 then performs the estimation of the uplink channel quality by comparing the known redirected reference signal with the estimated received redirected reference signal. This may performed by comparing the amplitude(s) and/or phase(s) of the origin redirected reference signal and received redirected reference signal.

604. The mobile terminal 120 may transmit a report to the base station 114, the report comprising the estimated uplink channel quality.

605. The mobile terminal 120 determines adaptive modulation and/or coding scheme and/or which power to use, and/or antenna weights, based on the estimated uplink channel quality.

Figure 7:
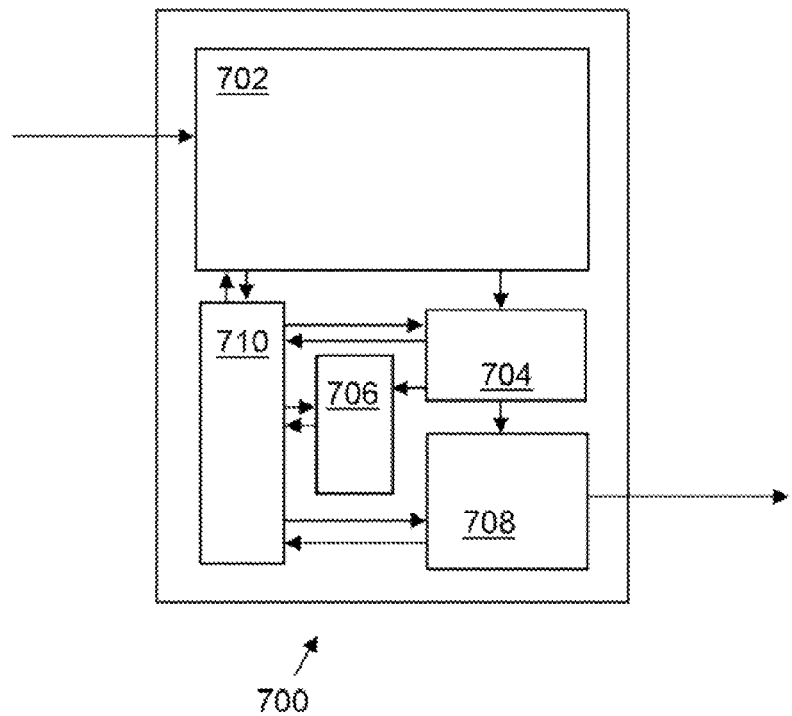
FIG. 7 is a schematic block diagram illustrating an arrangement in a mobile terminal.

To perform the present method steps, the mobile terminal 120 comprises an arrangement 700 as depicted in FIG. 7. The mobile terminal arrangement 700 comprises a receiver 702 for receiving a redirected reference signal 220,350 on the uplink band, from the base station 114, said redirected reference signal 220,350 being intended for uplink channel estimation. The mobile terminal knows the origin redirected reference signal transmitted by the base station 114 and the mobile terminal arrangement 700 comprises an estimation unit 704 for estimation of the uplink channel quality, the estimation unit 704 being arranged to estimate the received redirected reference signal, and further being arranged to compare the known redirected reference signal with the estimated received redirected reference signal. The estimation unit 704 may further be arranged to make the comparing based on the amplitude(s) and/or phase(s) of the origin redirected reference signal and received redirected reference signal. The mobile terminal arrangement 700 may further comprise a determination unit 706 for determining adaptive modulation and/or coding scheme and/or which power to use, and/or antenna weights, based on the estimated uplink channel quality. The mobile terminal arrangement 700 may further comprise a transmitter 708 arranged to transmit a report to the base station 114, the report comprising the estimated uplink channel quality.

The present managing uplink channel estimation mechanism can be implemented through one or more processors, such as the processor 510 in the base station arrangement depicted in FIG. 5 and the processor 710 in the mobile terminal arrangement depicted in FIG. 7, together with computer program code for performing the functions of the invention. The program code mentioned above may also be provided as a computer program product, for instance in the form of a data carrier carrying computer program code for performing the present method when being loaded into the access point and/or the user equipment. One such carrier may be in the form of a CD ROM disc. It is however feasible with other data carriers such as a memory stick. The computer program code can furthermore be provided as pure program code on a server and downloaded to the access point and/or user equipment remotely.

The present invention is not limited to the above-describe preferred embodiments. Various alternatives, modifications and equivalents may be used. Therefore, the above embodiments should not be taken as limiting the scope of the invention, which is defined by the appending claims.

The invention claimed is:

1. A method for managing uplink channel estimation in a base station, comprising:
   transmitting downlink data from a base station to a mobile terminal in a radio access network over a first portion of a Frequency Division Duplex (FDD) spectrum, wherein the first portion of the FDD spectrum is designated for downlink data transfer;
   transmitting a predetermined reference signal from the base station to the mobile terminal over a second portion of the FDD spectrum, wherein the second portion of the FDD spectrum is designated for uplink data transfer and wherein the predetermined reference signal permits the mobile terminal to perform a channel estimate on at least a portion of the second portion of the FDD spectrum; and
   receiving uplink data transmitted from the mobile terminal to the base station over the second portion of the FDD spectrum;
   wherein:
   transmitting the predetermined reference signal comprises transmitting the predetermined reference signal during a first time period,
   receiving uplink data comprises receiving uplink data during a second time period different from the first time period, the first time period and the second time period are separated by a guard period, and
   transmitting downlink data from the base station to the mobile terminal comprises transmitting downlink data during a third time period, wherein the third time period includes the first time period, the second time period, and the guard period.

2. The method of claim 1, further comprising:
   receiving a report from the mobile terminal comprising a channel quality estimate for the second portion of the FDD spectrum; and
   scheduling the mobile terminal to transmit uplink data over the second portion of the FDD spectrum based on the report.

3. The method of claim 2, wherein the channel quality estimate comprises a first channel quality estimate, and the method further comprises:
   receiving an uplink reference signal from the mobile terminal over the second portion of the FDD spectrum; and
   estimating a second channel quality estimate of the second portion of the FDD spectrum based on the received uplink reference signal, wherein scheduling the mobile terminal to transmit uplink data based on the report comprises scheduling the mobile terminal to transmit uplink data based on both the first channel quality estimate and the second quality estimate.

4. A method for performing uplink channel estimation in a mobile terminal, comprising:
   receiving downlink data transmitted from a base station to a mobile terminal in a radio access network over a first portion of a Frequency Division Duplex (FDD) spectrum, wherein the first portion of the FDD spectrum is designated for downlink data transfer;
   receiving a predetermined reference signal transmitted from the base station to the mobile terminal over a second portion of the FDD spectrum, wherein the second portion of the FDD spectrum is designated for uplink data transfer;
   performing a channel estimate on at least a portion of the second portion of the FDD spectrum based on the predetermined reference signal; and
   transmitting uplink data to the base station over the second portion of the FDD spectrum;
   wherein:
   receiving the predetermined reference signal comprises receiving the predetermined reference signal during a first time period,
   transmitting uplink data comprises transmitting uplink data during a second time period different from the first time period, the first time period and the second time period are separated by a guard period, and
   receiving downlink data from the base station comprises receiving downlink data during a third time period, wherein the third time period includes the first time period, the second time period, and the guard period.

5. The method of claim 4, further comprising:
   transmitting a report to the base station comprising a channel quality estimate for the second portion of the FDD spectrum;
   receiving control information scheduling the mobile terminal to transmit uplink data over the second portion of the FDD spectrum based on the report; and
   transmitting uplink data to the base station in accordance with the control information.

6. The method of claim 5, further comprising transmitting an uplink reference signal to the base station over the second portion of the FDD spectrum, and wherein receiving control information comprises receiving control information scheduling the mobile terminal to transmit uplink data over the second portion of the FDD spectrum based on the report and the uplink reference signal.

7. An apparatus for wireless communication, comprising:
   a transmitter configured to transmit information wirelessly;

a received configured to receive wireless transmissions; and a processor configured to:

transmit downlink data to a mobile terminal over a first portion of a Frequency Division Duplex (FDD) spectrum using the transmitter, wherein the first portion of the FDD spectrum is designated for downlink data transfer;

transmit a predetermined reference signal to the mobile terminal over a second portion of the FDD spectrum using the transmitter, wherein the second portion of the FDD spectrum is designated for uplink data transfer and wherein the predetermined reference signal permits the mobile terminal to perform a channel estimate on at least a portion of the second portion of the FDD spectrum; and receive, using the receiver, uplink data transmitted by the mobile terminal over the second portion of the FDD spectrum;

wherein the processor is configured to:

transmit the predetermined reference signal by transmitting the predetermined reference signal during a first time period, receive uplink data by receiving uplink data during a second time period different from the first time period, wherein the first time period and the second time period are separated by a guard period, and transmit downlink data to the mobile terminal by transmitting downlink data during a third time period, wherein the third time period includes the first time period, the second time period, and the guard period.

8. The apparatus of claim 7, wherein the processor is further configured to:

receive a report from the mobile terminal using the receiver, wherein the report comprises a channel quality estimate for the second portion of the FDD spectrum; and schedule the mobile terminal to transmit uplink data over the second portion of the FDD spectrum based on the report.

9. The apparatus of claim 8, wherein the channel quality estimate comprises a first channel quality estimate, and the processor is further configured to:

receive, using the receiver, an uplink reference signal from the mobile terminal over the second portion of the FDD spectrum; and estimate a second channel quality estimate of the second portion of the FDD spectrum based on the received uplink reference signal, wherein the transmitter is configured to schedule the mobile terminal to transmit uplink data based on the report by scheduling the mobile terminal to transmit uplink data based on both the first channel quality estimate and the second quality estimate.

10. An apparatus for wireless communication, comprising:

a transmitter configured to transmit information wirelessly;

a received configured to receive wireless transmissions; and a processor configured to:

receive, using the receiver, downlink data transmitted by a base station in a radio access network over a first portion of a Frequency Division Duplex (FDD) spectrum, wherein the first portion of the FDD spectrum is designated for downlink data transfer;

receive, using the receiver, a predetermined reference signal transmitted by the base station over a second portion of the FDD spectrum, wherein the second portion of the FDD spectrum is designated for uplink data transfer;

perform a channel estimate on at least a portion of the second portion of the FDD spectrum based on the predetermined reference signal; and transmit uplink data to the base station over the second portion of the FDD spectrum using the transmitter;

wherein the processor is configured to:

receive the predetermined reference signal by receiving the predetermined reference signal during a first time period;

transmit uplink data by transmitting uplink data during a second time period different from the first time period, wherein the first time period and the second time period are separated by a guard period, and receive downlink data from the base station by receiving downlink data during a third time period, wherein the third time period includes the first time period, the second time period, and the guard period.

11. The apparatus of claim 10, wherein the processor is further configured to:

transmit a report to the base station using the transmitter, wherein the report comprises a channel quality estimate for the second portion of the FDD spectrum;

receive, using the receiver, control information scheduling the apparatus to transmit uplink data over the second portion of the FDD spectrum based on the report; and transmit uplink data to the base station in accordance with the control information using the transmitter.

12. The apparatus of claim 11, wherein the processor is further configured to transmit an uplink reference signal to the base station over the second portion of the FDD spectrum using the transmitter, and wherein the processor is configured to receive control information by receiving control information scheduling the apparatus to transmit uplink data over the second portion of the FDD spectrum based on the report and the uplink reference signal.

* * * * *